J. R. BROADLEY.
MACHINE FOR GRINDING ORES, MINERAL STONES, AND THE LIKE.
APPLICATION FILED JULY 15, 1918.

1,392,887.

Patented Oct. 4, 1921.
5 SHEETS—SHEET 1.

Witnesses.
Inventor:

J. R. BROADLEY.
MACHINE FOR GRINDING ORES, MINERAL STONES, AND THE LIKE
APPLICATION FILED JULY 15, 1918.

1,392,887.

Patented Oct. 4, 1921.
5 SHEETS—SHEET 2.

UNITED STATES PATENT OFFICE.

JOSEPH RICHARD BROADLEY, OF LONDON, ENGLAND.

MACHINE FOR GRINDING ORES, MINERAL STONES, AND THE LIKE.

1,392,887.   Specification of Letters Patent.   Patented Oct. 4, 1921.

Application filed July 15, 1918. Serial No. 245,058.

(GRANTED UNDER THE PROVISIONS OF THE ACT OF MARCH 3, 1921, 41 STAT. L., 1313.)

*To all whom it may concern:*

Be it known that I, JOSEPH RICHARD BROADLEY, a subject of the King of Great Britain, residing at 60 Princes avenue, Alexandra Park, London, N. 22, in the county of London, in England, have invented a new and useful Improvement in or Relating to Machines for Grinding Ores, Minerals, Stones, and the like, (for which I have filed application in Great Britain, #10,145, dated July 13, 1917,) of which the following is a specification.

The invention relates to machines for grinding ores, minerals, stones and the like.

It has been previously proposed to construct grinding or crushing mills with means for screening the ground material and returning the tailings to the mill.

The object of my invention is to provide an improved construction of machine which will combine the function of a revolving grinding mill of the type usually known as a ball, pebble or tube mill, with those of a revolving screen for the purpose of evacuating the material under treatment (hereinafter referred to as the ore) when it becomes sufficiently fine to pass the meshes of the screen and thereby minimizing the reduction of such material to a state of finer sub-division than may be desirable.

Figure 1:
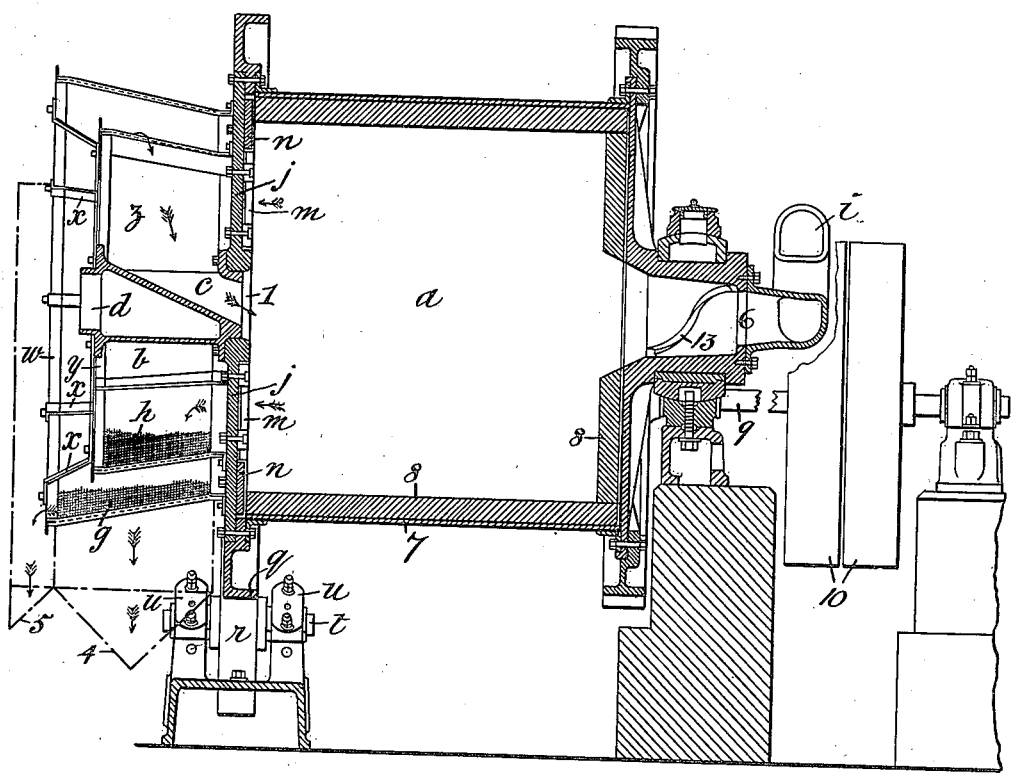
Figure 2:
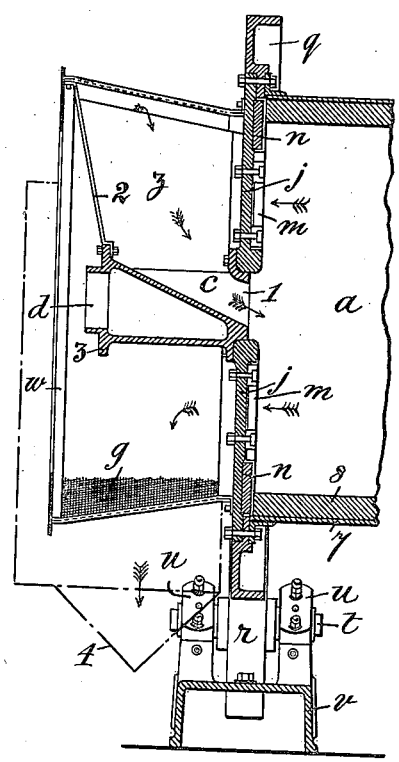
Figure 3:
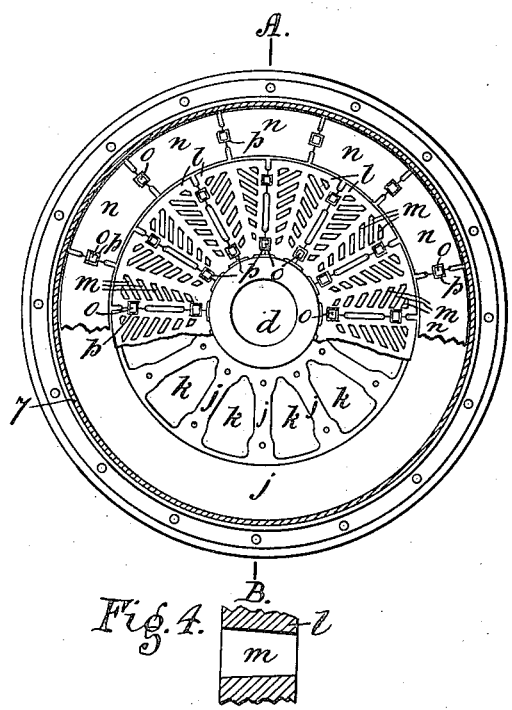
Figure 4:
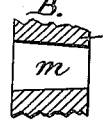
Figure 5:
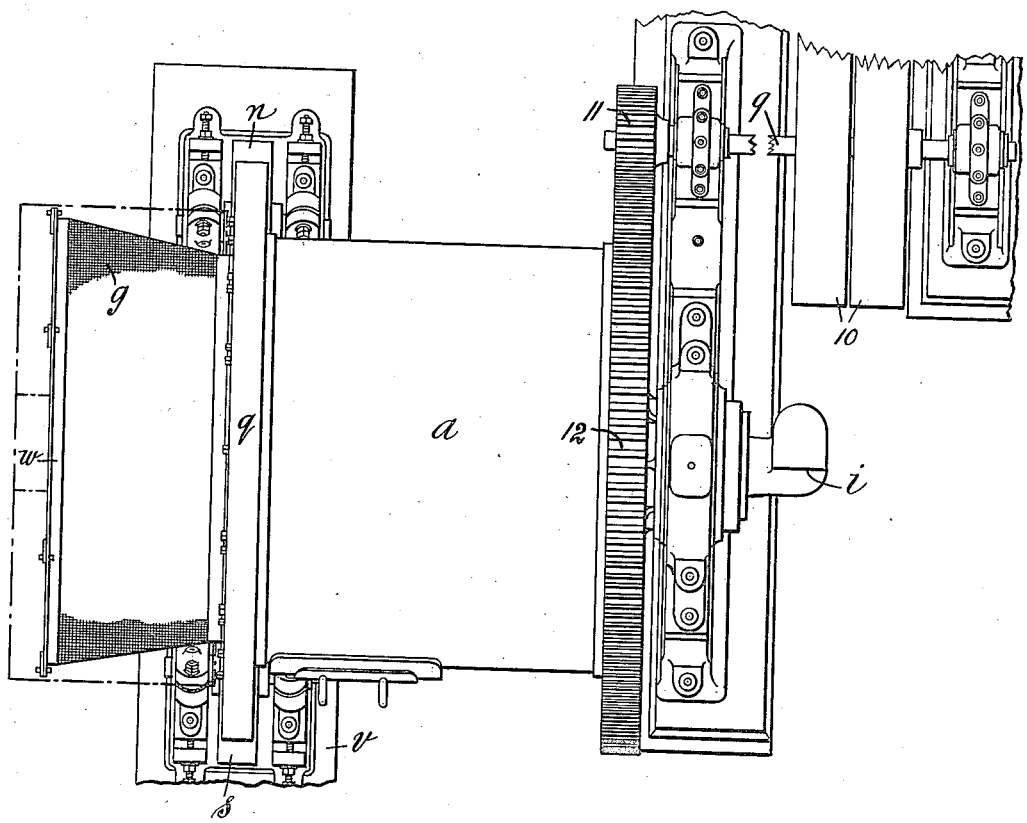
Figure 6:
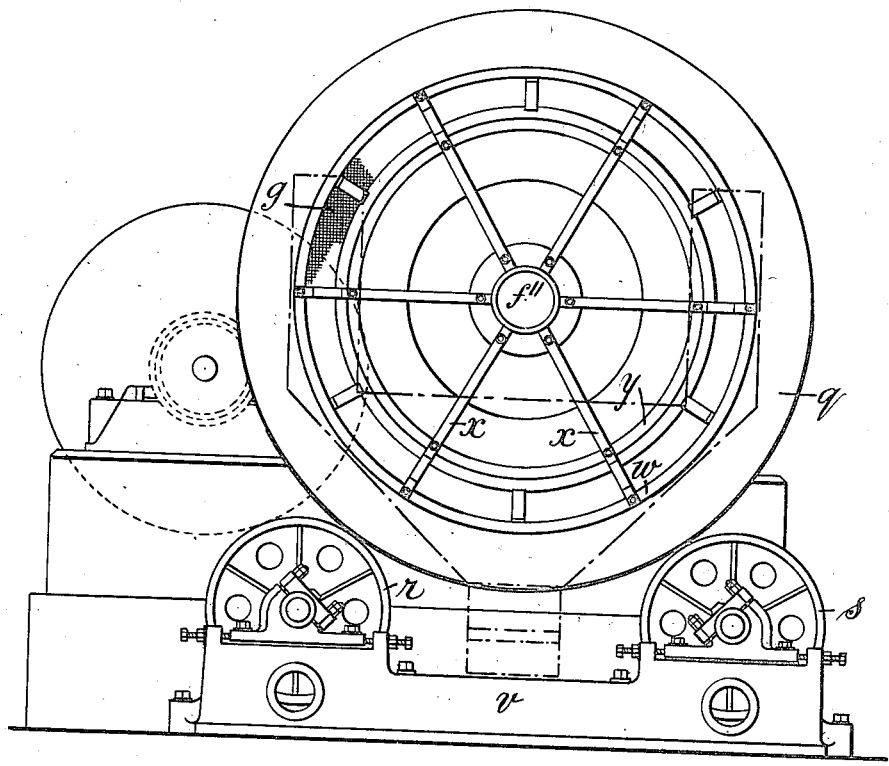
Figure 7:
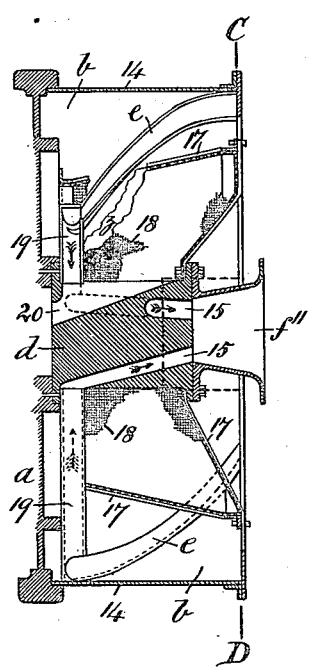
Figure 8:
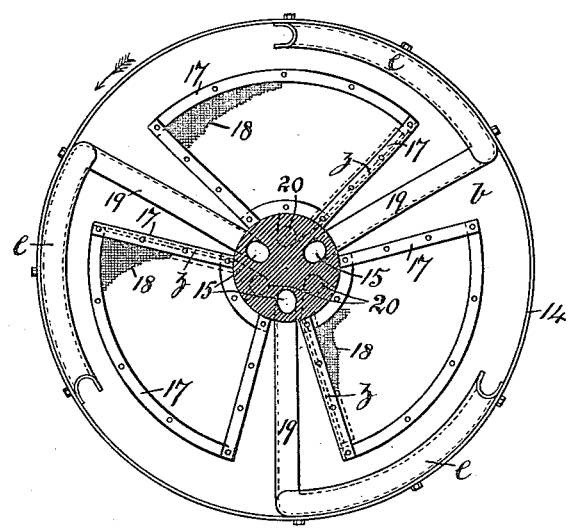

In the accompanying drawings, Figure 1, is a longitudinal section of a double revolving screen machine; Fig. 2, is a longitudinal section of a single revolving screen machine on line A B, in Fig. 3; Fig. 3, is an elevation showing part end plates, part grids and part grid plate broken off in parts for convenience; Fig. 4, is an enlarged section of the tapered perforations in the grids; Fig. 5, is a plan of Figs. 1 and 2; Fig. 6, is an end elevation at delivery end; Fig. 7, is a longitudinal sectional elevation of the secondary compartment of a segmental screen machine having three delivery ports and three return ports, and Fig. 8, is a sectional elevation of same on line C D, in Fig. 7.

My invention makes use of a cylinder divided into two compartments by a diaphragm provided with apertures to permit the passage of small particles of ore while preventing the passage of larger pieces and of the balls, pebbles or other grinding medium (hereinafter termed the balls).

The primary compartment $a$ of the cylinder is used in the ordinary manner to reduce the ore by impact and attrition in company with the balls contained in the compartment and the secondary compartment $b$ is provided with means herein described for the purpose of screening the ores, evacuating that portion which has reached the desired fineness and returning the remainder to the primary compartment for further grinding, through an aperture $c$ or apertures at or about the center of the diaphragm as in Fig. 1.

A screen $h$ which may be of cylindrical, conical or segmental construction incloses a tube $d$ (hereinafter termed the return trunnion) the shell of which is provided with one or more passages communicating with the central aperture $c$ of the diaphragm. Particles of ore which are too large to pass the meshes of the screen are returned as the mill revolves to the primary compartment of the mill by one or more radial chutes $z$ connecting the inner circumference and ends of the screen with the return tube.

The radial chutes $z$ may be of solid or perforated plates or of the same material as the meshes of the screen and their number will correspond with the number of passages in the tube $d$.

A tube $d'$ (hereinafter termed the fines tube) which may be attached to form a continuation of or be integral with the return tube $d$ will in like manner communicate by one or more passages with the discharge spout $f''$ of the secondary compartment $b$. In Fig. 7, $d'$ is shown integral with $d$.

The secondary compartment is provided with one or more partly spiral and partly radial chutes $e$ which may be of semi-circular construction which will be attached to the inside of the shell 14 and to the face of the diaphragm grid plate $j$ in the secondary compartment $b$ and will connect the inner circumference of the secondary compartment with the fines tube $d'$ and thereby as the mill revolves the ore which has passed the meshes 18 of the screen is delivered through the fines tube $d'$ and discharged from the spout $f''$ as finished product.

The mill may be fed in any ordinary manner preferably through the mouth $i$ of a tube communicating to the primary compartment and the finished product may be delivered through a discharge tube or through apertures in the outer wall or periphery of the secondary compartment.

In Fig. 2 I construct a machine having a primary compartment $a$ and a secondary compartment $b$ connected together by a grid plate $j$ with openings $k$. These said openings $k$ are covered with grids $l$ which are provided with perforations $m$ also liner plates $n$. The liner plates $n$ and grids $l$ are secured to the grid plate $j$ by square headed bolts $o$. The liner plates $n$ and grids $l$ are provided with square recesses $p$ one half recess in each plate to receive the bolt heads $o$ as shown in Figs. 2 and 3.

The primary compartment $a$ is connected to the secondary compartment $b$ by the grid plate $j$. A circular tire $q$ revolves on rollers $r$ and $s$, the said rollers $r$ and $s$ being mounted on spindles $t$ operating in bearings $u$ supported by a hollow cast iron platform $v$ as shown in Figs. 1, 2, 5 and 6.

The secondary compartment $v$ consists of an outer circular frame $w$ and an inner frame $y$ bolted together by branch ties $x$ from the periphery of the hollow tube $d$. The said frame $w$ supports the fine mesh screen $g$, and the frame $y$ supports the coarse mesh screen $h$, as shown in Fig. 1, in the case of a double screen. Fig. 2, shows a single screen machine having a single plate $z$ which leads into the return port $c$ so that the returned material falls into the primary compartment $a$ for regrinding. Stays 2 are provided to connect the flange 3 of the hollow tube $d$. In Fig. 1 the ejected material travels through the grid $l$, grid plates $j$ through the coarse meshes $h$ and fine meshes $g$, and falls into a receptacle 4, as indicated by arrows, but that material which passes meshes $h$ and is too large to pass meshes $g$ falls from the mouth of the frame $w$ into a receptacle 5. All material not passing the screen $h$ is picked up by the plate $z$ and returned into the primary compartment $a$ through the aperture $c$, as indicated by arrows verging from the top of the plate or chute $z$, as shown in Figs. 1 and 2. The other end of the machine shown in Fig. 1 is provided with a tube 6 having a feed scoop or mouth $i$, through which the machine is fed with material. The said tube 6 is mounted on suitable bearings now in common use. The primary compartment $a$ is provided with a shell 7 having a lining 8 in the usual manner. A shaft 9 is mounted on bearings having fast and loose pulleys 10 and a cog driver 11 which engages with a cog follower 12 as shown in Fig. 5. An open fixed screw 13 is provided in the tube 6 in order to aid the travel of the material from the feed mouth $i$ as the machine revolves as shown in Fig. 1.

An alternate device is shown in Figs. 7 and 8, which consists of a machine constructed with three chutes $e$ formed in equal division in the inside of the secondary compartment $b$. Each of the aforesaid chutes $e$ discharges the finished material into a discharge port 15 and through the tube $d'$. The secondary compartment $b$ is provided with three frames 17. These said frames are covered with coarse or fine meshes 18 through which the finished material passes. The unfinished material that may fall into the secondary compartment $b$ is collected by the screens 18 as the apparatus revolves and returned by the radial chutes $z$ through the ports 20 into the primary compartment $a$ as indicated by arrow in Fig. 7.

The balls or pebbles are situated inside the primary compartment $a$. These said balls or pebbles operate on the material as the machine revolves and thereby do the work of grinding the material as it passes through the machine as hereinbefore described.

I claim:

1. In a grinding machine, the combination with a grinding compartment, of a separating compartment arranged at one end of and having communication with the grinding compartment, a screen arranged within the separating compartment, a tube arranged axially of the separating compartment and formed with a return passage opening through the circumference of the trunnion and delivering through the end thereof into the grinding compartment, said tube being also formed with a discharge passage opening through the circumference of the trunnion and delivering through the end thereof remote from the grinding compartment, means arranged within the screen to pick up the material not delivered through the screen and directed into the return passage of the tube, and means arranged exteriorly of the screen to receive the material delivered through the screen and directed into the discharge passage of the tube.

2. In a grinding machine, the combination with a grinding compartment, of a separating compartment arranged at one end of and having communication with the grinding compartment, a screen arranged within the separating compartment and formed with a return passage opening through the circumference of the tube and delivering through the end thereof into the grinding compartment, said tube being also formed with a discharge passage opening through the circumference of the tube and delivering through the end thereof remote from the grinding compartment, a spiral chute receiving material from within the screen and delivering the same to the return passage of the tube, and a spiral chute receiving the material delivered through the screen and returning the same to the discharge passage of the tube.

JOSEPH RICHARD BROADLEY.